(12) United States Patent
Hartmann et al.

(10) Patent No.: US 6,931,438 B2
(45) Date of Patent: Aug. 16, 2005

(54) SYSTEM AND METHOD FOR SERVER DISPLAY CONFIRMATION RECORD RESPONSE IN A CONNECTION ORIENTED CLIENT / SERVER PROTOCOL

(75) Inventors: Richard G. Hartmann, Endicott, NY (US); Daniel L. Krissell, Hallstead, PA (US); Thomas E. Murphy, Jr., Binghamton, NY (US); Francine M. Orzel, Endicott, NY (US); Paul F. Rieth, Apalachin, NY (US); Jeffrey S. Stevens, Endwell, NY (US)

(73) Assignee: International Business Machines Corporation, Armonk, NY (US)

( * ) Notice: Subject to any disclaimer, the term of this patent is extended or adjusted under 35 U.S.C. 154(b) by 789 days.

(21) Appl. No.: 09/827,012

(22) Filed: Apr. 5, 2001

(65) Prior Publication Data

US 2003/0093534 A1 May 15, 2003

(51) Int. Cl.[7] .............................................. G06F 15/16
(52) U.S. Cl. ...................... 709/219; 709/203; 709/229; 709/227; 709/217; 709/224; 709/228; 709/225; 709/232
(58) Field of Search ................................ 709/203, 219, 709/229, 227, 217, 224, 228, 232, 225

(56) References Cited

U.S. PATENT DOCUMENTS

| 5,301,280 | A | * | 4/1994 | Schwartz et al. ............ 709/237 |
| 5,628,005 | A | * | 5/1997 | Hurvig ............................ 707/8 |
| 5,732,218 | A | * | 3/1998 | Bland et al. ................. 709/224 |
| 5,758,062 | A | | 5/1998 | McMahon et al. ............. 714/38 |
| 5,931,913 | A | * | 8/1999 | Meriwether et al. ........ 709/227 |
| 6,006,018 | A | | 12/1999 | Burnett et al. ............... 709/219 |
| 6,052,728 | A | * | 4/2000 | Fujiyama et al. ........... 709/224 |
| 6,076,110 | A | * | 6/2000 | Murphy et al. ............. 709/228 |
| 6,122,276 | A | * | 9/2000 | Boe et al. ..................... 370/389 |
| 6,128,662 | A | * | 10/2000 | Bolton et al. ............... 709/228 |
| 6,134,544 | A | * | 10/2000 | Glitho et al. .................. 707/3 |
| 6,304,905 | B1 | * | 10/2001 | Clark ........................... 709/224 |

OTHER PUBLICATIONS

Gainey Jr., C. W. "Status Reporting Requirement in a Network" IBM Technical Disclosure Bulletin, vol. 34, No. 3, Aug. 1991, pp. 315–317.
HTTP/1.2 Extention Protocol (PEP), downloaded from <http://www.w3.org/TR/WE–http–pep–960820>.
Zhang, XP et al. "A Method to Replay the Network Traffics and Review Testing Errors", RD v42 n422 Jun. 1999 article 42282.

* cited by examiner

*Primary Examiner*—Anthony Knight
*Assistant Examiner*—Thomas Pham
(74) *Attorney, Agent, or Firm*—Shelley M Beckstrand

(57) ABSTRACT

A system and method for operating a Telnet client to establish a network connection with a Telnet server. Environment parameters are negotiated for establishing a connection-oriented connection of the client to the server, the parameters including a explicit or implicit request for the server to provide a confirmation record. Responsive to that request, the server provides a confirmation record to the client selectively including the virtual device name assigned randomly, automatically, or explicitly to the connection by the server, system kernel, exit programs, or system policies (regardless of the virtual device name requested by the attaching client device), or a return code indicative of a cause for failure to establish the connection.

15 Claims, 2 Drawing Sheets

SYSTEM AND METHOD FOR SERVER DISPLAY CONFIRMATION RECORD RESPONSE IN A CONNECTION ORIENTED CLIENT / SERVER PROTOCOL

BACKGROUND OF THE INVENTION

1. Technical Field of the Invention

This invention pertains to connection oriented client/server negotiation protocols. More specifically, it pertains to Telnet negotiation protocols for display and printer sessions.

2. Background Art

There is a need in the art to enable a Telnet client when attempting to connect to a Telnet server to obtain connection status information including, for example, why did a connection request fail; why did a client auto-sign-on request fail; or what is the name of the virtual terminal display device assigned to this client. Auto-sign-on requests may fail, for example, because of an incorrect password or profile, a disabled or unknown profile, required encryption, expired user, and so forth.

This traditional Telnet support is accomplished in accordance with the following suite of Network Working Group Request for Comments (RFCs): Postel, J. and J. Reynolds, "Telnet Protocol Specification", STD 8, RFC 854, May 1983; Postel, J. and J. Reynolds, "Telnet Option Specifications", STD 8, RFC 855, May 1983; Postel, J. and J. Reynolds, "Telnet Binary Transmission", STD 27, RFC 856, May 1983; VanBokkeln, J., "Telnet Terminal-Type Option", RFC 1091, February 1989; Postel, J. and J. Reynolds, "Telnet End of Record Option", RFC 885, December 1983; Alexander, S., "Telnet Environment Option", RFC 1572, January 1994; Chmielewski, P., "5250 Telnet Interface", RFC 1205, February 1991; Postel, J. and J. Reynolds, "Telnet Supress Go Ahead Option", STD 29, RFC 858, May 1983; and Reynolds, J. and J. Postel, "Assigned Numbers", STD 2, RFC 1700, October 1994.

The above suite of referenced RFCs jointly and severally fall short of providing an understanding of why a connection request has failed, and such is needed in the art to enable a client to correct the problem and retry a connection request such that it will be successful.

Similarly, when a connection request has succeeded, the client may need to know the name of the virtual terminal display device assigned to this client. Knowing the device name of a client connection is useful for audit logging, billing and error analysis for connected clients.

Heretofore, screen scraping technology has been employed to acquire a device name, relying on the screen layout to analyze the location of the device name on the screen. If the sign-on panel is altered such that the device name is in a different location, screen scraping fails. Also, this screen scraping technology does not work when the sign-on panel is bypassed.

It is an object of the invention to provide an improved system and method for establishing a client/server connection.

It is a further object of the invention to provide an improved system and method for negotiating a client/server connection in a connection-oriented protocol.

It is a further object of the invention to provide a system and method for requesting and providing a confirmation record selectively including the virtual device name assigned by a server to a client device or an error code representing the cause of failure of connection.

It is a further object of the invention to provide a system and method for enabling a client to assign a session name to the GUI window for the client emulator responsive to a virtual device name assigned by a server to the client.

It is a further object of the invention to provide a system and method for providing to a client the device name assigned by a server to the client connection for audit logging, billing and error analysis.

SUMMARY OF THE INVENTION

A system and method for operating a client to establish a network connection with a server. Environment parameters are negotiated for establishing a connection-oriented connection of the client to a server, the parameters including a request for the server to provide a confirmation record. Responsive to that request, the server provides the confirmation record to the client, the confirmation record selectively including the virtual device name assigned to the connection by the server or a return code indicative of a cause for failure to establish the connection.

In accordance with an aspect of the invention, there is provided a computer program product configured to be operable to operating a server in a network according to method steps including providing to a client a confirmation record including, for a successful connection, a virtual device name and, for an unsuccessful connection, a return code indicative of the cause of failure of the connection.

Other features and advantages of this invention will become apparent from the following detailed description of the presently preferred embodiment of the invention, taken in conjunction with the accompanying drawings.

BEST MODE FOR CARRYING OUT THE INVENTION

Figure 1:
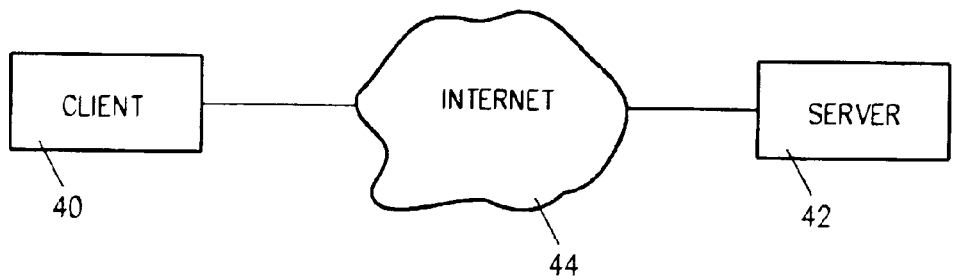
FIG. 1 is a system diagram illustrating a client/server system.

Referring to FIG. 1, in accordance with the preferred embodiments of the invention, a confirmation record technology is provided for connection oriented client/server sessions, such as TCP/IP Telnet display sessions. This confirmation record technology is described hereafter and in T. Murphy, Jr., P. Rieth, J. Stevens, "5250 Telnet Enhancements", Network Working Group Request for Comments: 2877, July 2000, the teachings of which are incorporated by reference. With this technology, a Telnet client 40, for example, can connect to a Telnet server 42 over a network connection 44 and optionally request a detailed return code that describes the status of the connection. With the information of the return code, the client 40 is able to ascertain in the event of a successful connection the name of the virtual display device assigned to this client 40, and in the event of an unsuccessful connection the information required to correct the problem and retry a connection request such that it is successful. In the event of a successful connection, the return code, or confirmation record, allows the client to know the virtual terminal device name without the need to employ a screen scrape scheme to analyze the sign-on panel, assuming it is even available. Knowing the virtual terminal device name enables the client to assign a session name to the GUI window for the client emulator. Also, knowing the device name of a client connection is very useful for audit logging, billing and error analysis for connection clients.

Figure 2:
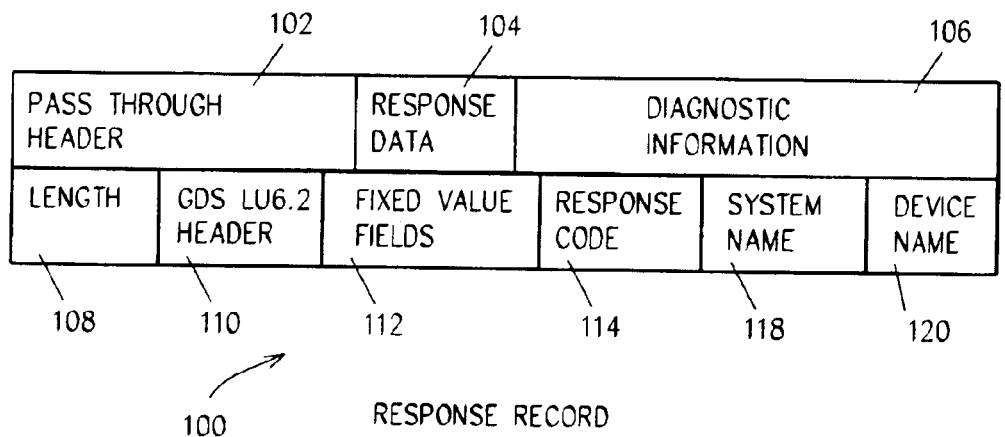
FIG. 2 is a diagram illustrating the format of a response record in accordance with the preferred embodiment of the invention.

Referring to FIG. 2, the format of a response record 100 includes pass through header 102, response data 104, and diagnostic information 106. Pass through header 108 includes length field 108, header 110, and several characters from fixed value fields 112. Response data 104 includes several characters from field 112. Diagnostic information includes a few characters from field 112, response code 114, system name 118 and device name 120.

In accordance with a preferred embodiment of the invention, Table 1 presents an example of a success response record 100 according to the format of FIG. 2, and Table 2 presents an error response record 100 according to the same format. Table 3 gives some of the response codes 114 for a success response 100 and Table 4 some of the response codes 114 for an error response record 100. The response record in Table 2 is one that reports an error. In this example the virtual device named "MYDEVICE", is not available on the target system "TARGET", because the device is not available. This error may indicate that the device was already assigned to another Telnet session.

TABLE 1

Example Success Response Record

```
+----------------------------------------------------------------------+
|       +----Pass-Through header                                        |
|       |       +---Response data                                       |
|       |       |       +---Start diagnostic information                |
|       |       |       |                                               |
+-------|-------|-------|-----------------------------------------------+
|       ||      ||      ||                                              |
|004912A090000560060020C0003D0000C9F9F0F2E3C1D9C7C5E34040D4E8C4C5       |
|                                |       | T A R G E T    M Y D E       |
|                                +-------+                              |
|                              Response Code (I902)                     |
------------------------------------------------------------------------

E5C9C3C54040000000000000000000000000000000000000000000000000000000
  V I C E
                        +----End of diagnostic information
                        |
  ----------------+
                  |
|000000000000000000|
+----------------------------------------------------------------------+
```

'0049'X = Length pass-through data, including this length field  
'12A0'X = GDS LU6.2 header  
'90000560060020C0003D0000'X     = Fixed value fields  
'C9F9F0F2'X     = Response Code (I902)  
'E3C1D9C7C5E34040'X     = System Name (TARGET)  
'D4E8C4C5E5C9C3C54040'X     = Object Name (MYDEVICE)

TABLE 2

Example Error Response Record

```
+----------------------------------------------------------------------+
|       +----Pass-Through header                                        |
|       |       +---Response data                                       |
|       |       |       +---Start diagnostic information                |
|       |       |       |                                               |
+-------|-------|-------|-----------------------------------------------+
|       ||      ||      ||                                              |
|004912A0900005600600082000003D0000F8F9F0F2E3C1D9C7C5E34040D4E8C4C5     |
|                                |       | T A R G E T    M Y D E       |
|                                +-------+                              |
|                              Response Code (8902)                     |
------------------------------------------------------------------------

E5C9C3C54040000000000000000000000000000000000000000000000000000000
  D I C E
                        +----End of diagnostic information
                        |
  ----------------+
                  |
|000000000000000000|
+----------------------------------------------------------------------+
```

FIG. 2. Example of an error response record.  
'0049'X = Length pass-through data, including this length field  
'12A0'X = GDS LU6.2 header TABLE 2-continued Example Error Response Record

| | |
|---|---|
| '90000560060020C0003D0000'X | = Fixed value fields |
| 'F8F9F0F2'X | = Response Code (8902) |
| 'E3C1D9C7C5E34040'X | = System Name (TARGET) |
| 'D4E8C4C5E5C9C3C54040'X | = Object Name (MYDEVICE) |

TABLE 3

Start-Up Response Record Success Response Codes

| CODE | DESCRIPTION |
|---|---|
| I901 | Virtual device has less function than source device |
| I902 | Session successfully started |
| I906 | Automatic sign-on requested, but not allowed. Session still allowed; a sign-on screen will be coming. |

TABLE 4

Start-Up Response Record Error Response Codes

| CODE | DESCRIPTION |
|---|---|
| 2702 | Device description not found. |
| 2703 | Controller description not found. |
| 2777 | Damaged device description. |
| 8901 | Device not varied on. |
| 8902 | Device not available. |
| 8903 | Device not valid for session. |
| 8906 | Session initiation failed. |
| 8907 | Session failure. |
| 8910 | Controller not valid for session. |
| 8916 | No matching device found. |
| 8917 | Not authorized to object. |
| 8918 | Job canceled. |
| 8920 | Object partially damaged. |
| 8921 | Communications error. |
| 8922 | Negative response received. |
| 8923 | Start-up record built incorrectly. |
| 8925 | Creation of device failed. |
| 8928 | Change of device failed. |
| 8929 | Vary on or vary off failed. |
| 8930 | Message queue does not exist. |
| 8934 | Start-up for S/36 WSF received. |
| 8935 | Session rejected. |
| 8936 | Security failure on session attempt. |
| 8937 | Automatic sign-on rejected. |
| 8940 | Automatic configuration failed or not allowed. |
| I904 | Source system at incompatible release. |

Figure 3:
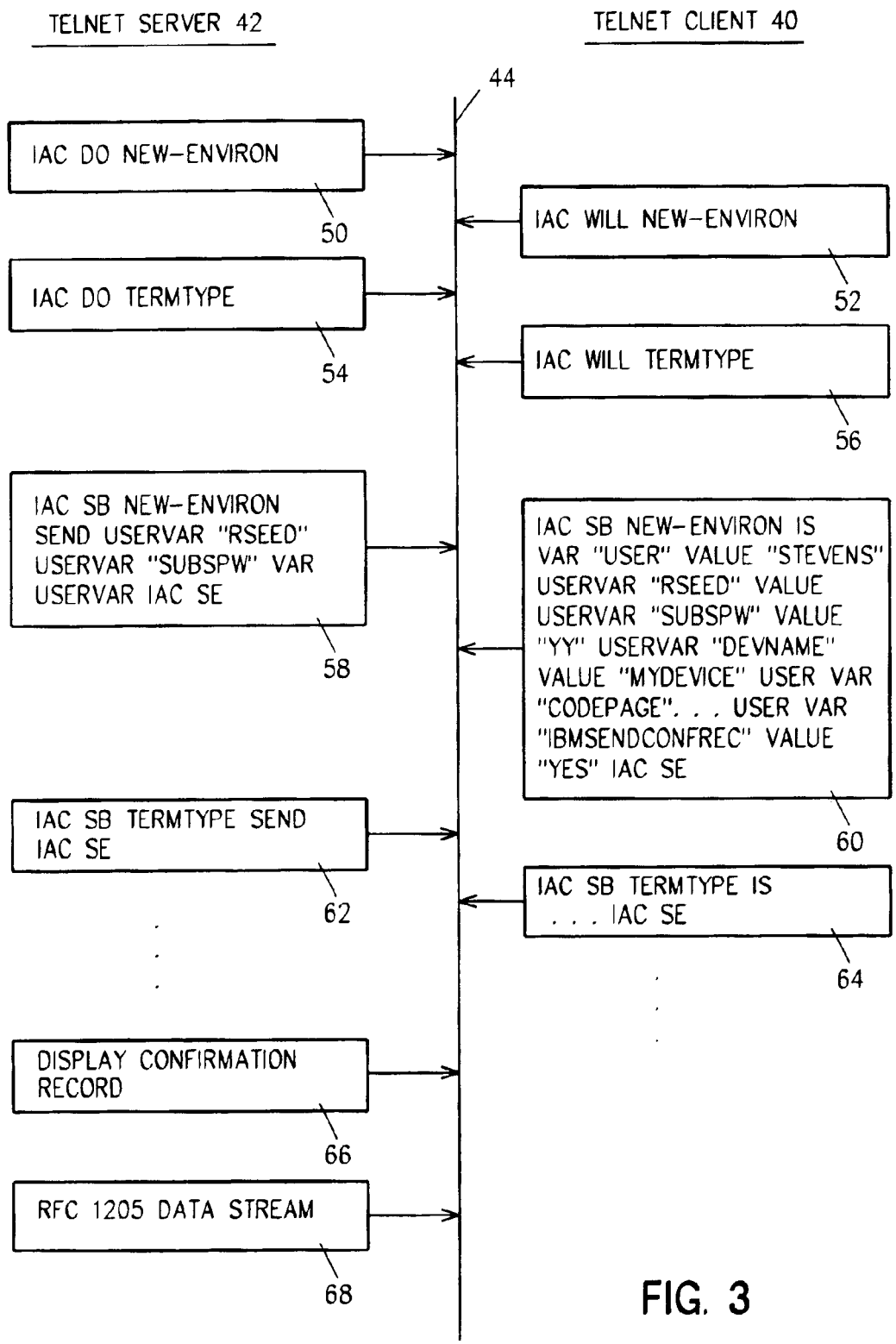
FIG. 3 is a flow chart representation of negotiations for a confirmation record in accordance with the preferred embodiment of the invention.

Referring to FIG. 3, method steps of an exemplary negotiation for a confirmation record are summarized in accordance with the preferred embodiment of the invention.

In step 50, server 42 invites client 40 to engage in new environment negotiations. These negotiations are conducted in accordance with procedures described in S. Alexander, "Telnet Environment Options Negotiations", RFC 1572, January 1994.

In step 52, client 40 accepts the invitation to negotiate a new environment.

In step 54, server 42 opens negotiations for terminal type, which client 40 accepts in step 56.

In step 58, server 42 instructs client 40 to send several parameters, and in step 60 client 40 responds. In accordance with the preferred embodiment of the invention, in the response of step 60, client 40 requests with the code "USER-VAR 'IBMSENDCONFREC' VALUE 'YES'" that server 42 send a confirmation record 100. Alternatively, such a request may be implied from some other parameter in connection with the new environment negotiations. Thus, for example, client 40 may have to specifically request a confirmation record 100 when requesting connection of a virtual display device, but such would be implied when requesting connection of a virtual printer device.

Negotiations continue, for such additional environment parameters as end-of-record and binary, and then in step 66 server 42 transmits the confirmation record, followed in step 68 in this example of a successful connection with the data stream.

In Table 5, an expanded example is presented of environment option negotiations similar to those of FIG. 3. As shown, clear text is followed by hex representation. Thus, line 2 'FFFD27' is the hex representation of line 1 'IAC DO NEW-ENVIRON', lines 13–14 are the hex representation of lines 9–12, and lines 58–62 are a hex representation of the confirmation record of FIG. 2. The request for a confirmation record is illustrated at line 24. In line 59, the hex value 'C9F9F0F2' represents the successful return code 114 of I902 (see Table 3), and the device name 120 assigned to this virtual device is in the following ten hex bytes 'D1C5C6C6 E2C4E2D7 4040' on lines 59 and 60. IAC is a Telnet option negotiation code meaning "Interpret as command", SB represents "begin" and SE "end".

TABLE 5

TN5250E Environment Option Negotiations

| | Telnet Server | | Telnet Client |
|---|---|---|---|
| 1 | IAC DO NEW-ENVIRON | -> | |
| 2 | FFFD27 | | |
| 3 | | <- | IAC WILL NEW-ENVIRON |
| 4 | | | FFFB27 |
| 5 | IAC DO TERMTYPE | -> | |
| 6 | FFFD18 | | |
| 7 | | <- | IAC WILL TERMTYPE |
| 8 | | | FFFB18 |

TABLE 5-continued

TN5250E Environment Option Negotiations

| Telnet Server | | Telnet Client |
|---|---|---|
| 9 IAC SB NEW-ENVIRON SEND | | |
| 10 USERVAR "IBMRSEEDxxxxxxxx" | | |
| 11 USERVAR "IBMSUBSPW" | | |
| 12 VAR USERVAR IAC SE | -> | |
| 13 FFFA2701 0349424D 52534545 | | |
| 14 447D68B9 2BE04E04 040003FF F0 | | |
| 15 | | IAC SB NEW-ENVIRON IS |
| 16 | | VAR "USER" VALUE "JSTEVENS" |
| 17 | | USERVAR "IBMRSEED" VALUE |
| 18 | | USERVAR "IBMSUBSPW" VALUE |
| 19 | | "yyyyyyyy" |
| 20 | | USERVAR "DEVNAME" VALUE "JEFFSDSP" |
| 21 | | USERVAR "CODEPAGE" VALUE "37" |
| 22 | | USERVAR "CHARSET" VALUE "697" |
| 23 | | USERVAR "KBDTYPE" VALUE "USB" |
| 24 | | USERVAR "IBMSENDCONFREF" VALUE "YES" |
| 25 | <- | IAC SE |
| 26 | | FFFA2700 00555345 52014A53 54455645 |
| 27 | | 4E530349 424D5253 45454401 04696CD0 |
| 28 | | D7C41F81 0349424D 53554253 50570131 |
| 29 | | 96A30203 3F5321FD 03444556 4E414D45 |
| 30 | | 014A4546 46534453 5003434F 44455041 |
| 31 | | 47450133 37034348 41525345 54013639 |
| 32 | | 37034B42 44545950 45015553 4249424D |
| 33 | | 53454E44 434F4E46 52454301 594553FF |
| 34 | | F0 |
| 35 | | |
| 36 IAC SB TERMTYPE SEND | | |
| 37 IAC SE | -> | |
| 38 FFFA1801 FFF0 | | |
| 39 | <- | IAC SB TERMTYPE IS IBM-3179-2 IAC SE |
| 40 | | FFFA1800 49424D2D 33313739 2D32FFF0 |
| 41 IAC DO EOR | -> | |
| 42 FFFD19 | | |
| 43 | <- | IAC WILL EOR |
| 44 | | FFFB19 |
| 45 IAC WILL EOR | -> | |
| 46 FFFB19 | | |
| 47 | <- | IAC DO EOR |
| 48 | | FFFD19 |
| 49 IAC DO BINARY | -> | |
| 50 FFFD00 | | |
| 51 | <- | IAC WILL BINARY |
| 52 | | FFFB00 |
| 53 IAC WILL BINARY | -> | |
| 54 FFFB00 | | |
| 55 | <- | IAC DO BINARY |
| 56 | | FFFD00 |
| 57 Display Confirmation Record | -> | |
| 58 004912A0 90000560 060020C0 003D0000 | | |
| 59 C9F9F0F2 D9E2F0F1 F0404040 D1C5C6C6 | | |
| 60 E2C4E2D7 40400000 00000000 00000000 | | |
| 61 00000000 00000000 00000000 00000000 | | |
| 62 00000000 00000000 00FFEF | | |
| 63 | | |
| 64 RFC 1205 Data Stream | -> | |
| 65 001112A0 00000400 000304F3 0005D970 | | |
| 66 00FFEF | | |

Device name collision occurs when a Telnet client 40 sends the Telnet server 42 a virtual device name that it wants to use, but that device is already in use on the server 42. When this occurs, the Telnet server 42 sends a request to the client 40 asking it to try another device name. The environment option negotiation uses the USERVAR name of DEVNAME to communicate the virtual device name. Table 6 shows how the Telnet server 42 requests the Telnet client 40 to send a different DEVNAME when device name collision occurs, and is an example of how negotiations are done using environment variables, such as DEVNAME, USER, CODEPAGE, CHARSET, and so forth. These are negotiations for various display session attributes which, according to the present invention, is enhanced to include IBMSENDCONFREC.

TABLE 6

Negotiating Display Session Attributes

| | AS/400 Telnet server | | Enhanced Telnet client |
|---|---|---|---|
| 1 | IAC SB NEW-ENVIRON SEND | | |
| 2 | VAR USERVAR IAC SE | --> | |
| 3 | Server requests all environment variables be sent. | | |
| 4 | | | IAC SB NEW-ENVIRON IS USERVAR |
| 5 | | | "DEVNAME" VALUE "MYDEVICE1" |
| 6 | | | USERVAR "xxxxx" VALUE "xxx" |
| 7 | | | ... |
| 8 | | <-- | IAC SE |
| 9 | Client sends all environment variables, including DEVNAME. Server tries | | |
| 10 | to select device MYDEVICE1. If the device is already in use, server | | |
| 11 | requests DEVNAME be sent again. | | |
| 12 | IAC SB NEW-ENVIRON SEND | | |
| 13 | USERVAR "DEVNAME" IAC SE | --> | |
| 14 | Server sends a request for a single environment variable: DEVNAME | | |
| 15 | | | IAC SB NEW-ENVIRON IS USERVAR |
| 16 | | <-- | "DEVNAME" VALUE "MYDEVICE2" IAC SE |
| 17 | Client sends one environment variable, calculating a new value of | | |
| 18 | MYDEVICE2. If MYDEVICE2 is different from the last request, then server | | |
| 19 | tries to select device MYDEVICE2, else server disconnects client. If | | |
| 20 | MYDEVICE2 is also in use, server will send DEVNAME request again, and | | |
| 21 | keep doing so until it receives a device that is not in use, or the same | | |
| 22 | device name twice in row. | | |

Advantages Over the Prior Art

It is an advantage of the invention that there is provided an improved system and method for establishing a client/server connection.

It is a further advantage of the invention that there is provided an improved system and method for negotiating a client/server connection in a connection-oriented protocol.

It is a further advantage of the invention that there is provided a system and method for requesting and providing a confirmation record selectively including the virtual device name assigned by a server to a client device or an error code representing the cause of failure of connection.

It is a further advantage of the invention that there is provided a system and method for enabling a client to assign a session name to the GUI window for the client emulator responsive to a virtual device name assigned by a server to the client.

It is a further advantage of the invention that there is provided a system and method for providing to a client the device name assigned by a server to the client connection for audit logging, billing and error analysis.

Alternative Embodiments

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signals readable by a machine, for controlling the operation of a computer according to the method of the invention and/or to structure its components in accordance with the system of the invention.

Further, each step of the method may be executed on any general computer, such as an IBM System 390 (z Series), AS/400 (I Series), PC (x Series), p Series, or the like and pursuant to one or more, or a part of one or more, program elements, modules or objects generated from any programming language, such as C++, Java, Pl/1, Fortran or the like. And still further, each said step, or a file or object or the like implementing each said step, may be executed by special purpose hardware or a circuit module designed for that purpose.

While the preferred embodiment of the invention has been described primarily with respect to a Telnet environment or protocol, in a broader sense it is applicable to any connection oriented client/server protocol, such as a TCP/IP family of applications. Such protocols may make use of a confirmation record, served in accordance with the preferred embodiments of the present invention, confirming the status or other attributes associated with an actual connection. An example of such a protocol is the file transfer protocol (FTP), in which a connection is initiated and held for the duration of a file transfer. Telnet initiates and holds the connection for the duration of the dialogue between the attaching client emulator that initiates the connection to a targeted host server and its application.

Accordingly, the scope of protection of this invention is limited only by the following claims and their equivalents.

We claim:

1. A method for operating a Telnet client to establish a network connection with a server, comprising the steps of:
   negotiating environment parameters for establishing a connection-oriented connection with said server;
   said parameters including a request for said server to provide a confirmation record containing descriptive information about a connection which is held for the duration of a file transfer or dialog, said confirmation record selected from a set consisting of a success response record and an error response record, both said response records including diagnostic information describing connection status including a response code and a device name requested by said client; and
   responsive to said request, receiving said confirmation record.

2. The method of claim 1, said request being implied from a specific request to connect a virtual printer device.

3. The method of claim 1, said request being a specific request for a confirmation record in connection with a request to connect a virtual display device.

4. The method of claim 1, said confirmation record including a device name requested by said client and assigned by said server to said client connection.

5. The method of claim 1, said negotiating step including negotiating new environment and confirmation record parameters.

6. The method of claim 4, said confirmation record including a response code indicative of the cause of a failed connection.

7. The method of claim 6, responsive to said response code, retrying said negotiating step.

8. A method for operating a server in a network, comprising the steps of:
   receiving a connection request from a client;
   inviting said client to negotiate environment parameters;
   responsive to client acceptance, negotiating said parameters;
   assigning a virtual device name requested by said client to said client; and
   responsive to receiving a request for a confirmation record, providing to said client a confirmation record containing descriptive information about a connection which is held for the duration of a file transfer or dialog consisting of, for a successful connection, a success response code and diagnostic information including said virtual device name and, for an unsuccessful connection, diagnostic information including an error return code indicative of the cause of failure of said connection.

9. A system, comprising:
   a client;
   a server;
   a connection network for interconnecting said client and server according to a connection oriented client/server protocol in which a connection is initiated and held for duration selectively of a file transfer and a dialog; and
   said server selectively operable at the application level responsive to a request for a confirmation record containing descriptive information about a connection which is held for the duration of a file transfer or dialog from said client during negotiation for a connection oriented connection for providing said confirmation record to said client, said
   confirmation record selected from a set consisting of a success response record and an error response record, both said records having a return code and including, for a successful connection, a virtual device name requested by said client and assigned by said server to said client and, for an unsuccessful connection, said return code being indicative of a cause of failure of said connection.

10. The system of claim 9, said server being a Telnet server and said client a Telnet client.

11. The system of claim 10, said connection oriented protocol being a Telnet protocol according to which new environment parameters including an express or implicit request for said confirmation record may be negotiated.

12. A program storage device readable by a machine, tangibly embodying a program of instructions executable by a machine to perform method steps for operating a client to establish a network connection with a server according to a connection oriented client/server protocol in which a connection is initiated and held for duration selectively of a file transfer and a dialog session, said method steps comprising:
   negotiating environment parameters for establishing a connection-oriented connection with said server;
   said parameters including a request for said server to provide a status record; and
   responsive to said request, receiving said status record;
   said status record consisting of one of an error response and a success response, each said response consisting of diagnostic information including device name requested by said client and a response code selectively consisting of an error response code and a success response code.

13. A program storage device readable by a machine, tangibly embodying a program of instructions executable by a machine to perform method steps for operating a server in a network according to a connection oriented client/server protocol in which a connection is initiated and held for duration selectively of a file transfer and a dialog session, said method step comprising:
   receiving a connection request from a client;
   inviting said client to negotiate environment parameters;
   responsive to client acceptance, negotiating said parameters;
   assigning a virtual device name requested by said client to said client; and
   responsive to :receiving a request for a status record, providing to said client a status record consisting of diagnostic information including a return code including diagnostic information describing connection status and, for a successful connection, said virtual device name and, for an unsuccessful connection, said return code indicative of the cause of failure of said connection.

14. A computer program product for operating a client to establish a network connection:n with a server in a connection oriented client/server protocol in which a connection is initiated and held for duration selectively of a file transfer and a dialog session, said computer program product comprising:
   a computer readable medium;
   first program instructions for negotiating environment parameters for establishing a connection-oriented connection with said server;
   said parameters including a request for said server to provide a status record; and
   second program instructions, responsive to said request, for receiving said status record;
   said status record consisting of diagnostic information including device name requested by said client and connection status according to one of an error response code and a success response code; and wherein
   said first and second program instructions are recorded on said computer readable medium.

15. A computer program product for operating a server in a network according to a connection oriented client/server protocol in which a connection is initiated and held for duration selectively of a file transfer and a dialog session, said computer program product comprising:
   a computer readable medium;
   first program instructions for receiving a connection request from a client;
   second program instructions for inviting said client to negotiate environment parameters;

third program instructions, responsive to client acceptance, for negotiating said parameters;

fourth program instructions for assigning a virtual device name requested by said client to said client; and fifth program instructions, responsive to receiving a request for a status record, for providing to said client a status record consisting of a response code and, for a successful connection, said virtual device name and, for an unsuccessful connection, said return code indicative of the cause of failure of said connection; and wherein said first, second, third, fourth, and fifth program instructions are recorded on said computer readable medium.

* * * * *